(12) United States Patent
Hutter et al.

(10) Patent No.: US 12,554,894 B2
(45) Date of Patent: Feb. 17, 2026

(54) LOW-LATENCY MULTI-DOMAIN MASKING

(71) Applicant: Cryptography Research, Inc., San Jose, CA (US)

(72) Inventors: Michael Hutter, Vienna (AT); Victor Manuel Arribas Abril, Rotterdam (NL)

(73) Assignee: CRYPTOGRAPHY RESEARCH, INC., San Jose, CA (US)

(*) Notice: Subject to any disclaimer, the term of this patent is extended or adjusted under 35 U.S.C. 154(b) by 94 days.

(21) Appl. No.: 18/716,504

(22) PCT Filed: Nov. 28, 2022

(86) PCT No.: PCT/US2022/051054
§ 371 (c)(1),
(2) Date: Jun. 4, 2024

(87) PCT Pub. No.: WO2023/107285
PCT Pub. Date: Jun. 15, 2023

(65) Prior Publication Data
US 2025/0036818 A1 Jan. 30, 2025

Related U.S. Application Data

(60) Provisional application No. 63/341,516, filed on May 13, 2022, provisional application No. 63/287,001, filed on Dec. 7, 2021.

(51) Int. Cl.
*G06F 21/75* (2013.01)
*G06F 9/30* (2018.01)

(52) U.S. Cl.
CPC ........ *G06F 21/755* (2017.08); *G06F 9/30029* (2013.01)

(58) Field of Classification Search
None
See application file for complete search history.

(56) References Cited

U.S. PATENT DOCUMENTS 10,644,873 B2 5/2020 Wurcker et al.
11,018,849 B2 5/2021 Baker et al.
(Continued)

FOREIGN PATENT DOCUMENTS

WO WO-2021-118816 A1 6/2021
WO WO-2021-245101 A1 12/2021

OTHER PUBLICATIONS

Grob, Hannes, Domain-Oriented Masking-Generically Masked Hardware Implementations, Jun. 1, 2018, [retrieved on Feb. 6, 2023]. Retrieved from the internet <URL:https://diglib.tugraz.at/download.php?id=5c80ea0c43a56&locationo=browse>. 50 pages.
(Continued)

*Primary Examiner* — Trang T Doan
(74) *Attorney, Agent, or Firm* — The Neudeck Law Firm, LLC

(57) ABSTRACT

A multi-domain masked AND gate includes inner-domain calculations, re-sharing, register stage, cross-domain calculations, and compression. The inner-domain multiplication and the re-sharing are calculated prior to storing the re-shared variables in the register stage. Thus, the inputs to the cross-domain multiplication and the compression are performed on variables that have been refreshed by additional randomness. This AND gate does not need statistically independent inputs, is secure in the probing model even in the presence of glitches, also known as the robust probing model. A two-domain input and two domain output AND gate can be implemented using six (6) registers, four (4) two input logical AND gates, and eight (8) exclusive-OR (XOR) gates. The AND gate may also be used to implement an AES S-box that has two (2) register stages and takes two (2) clock cycles per computation.

20 Claims, 6 Drawing Sheets

(56) References Cited

U.S. PATENT DOCUMENTS

| | | | |
|---|---|---|---|
| 11,500,986 B2* | 11/2022 | Hoerder | G06F 21/755 |
| 2006/0200514 A1* | 9/2006 | Fischer | G06F 21/755 |
| | | | 708/446 |
| 2008/0005476 A1* | 1/2008 | Venkatesan | G06F 12/1416 |
| | | | 711/E12.098 |
| 2009/0116644 A1* | 5/2009 | Klimov | H04L 9/0625 |
| | | | 380/252 |
| 2015/0163054 A1 | 6/2015 | Roelse et al. | |
| 2017/0295015 A1* | 10/2017 | Pedersen | H04L 9/0894 |
| 2020/0313850 A1 | 10/2020 | Lin et al. | |
| 2021/0097175 A1* | 4/2021 | Hoerder | G06F 21/755 |

OTHER PUBLICATIONS

Gross, Hannes et al., "Domain-Oriented Masking: Compact Masked Hardware Implementations with Arbitrary Protection Order", In Proceedings of the 2016 ACM Workshop on Theory of Implementation Security (TIS'16), Association for Computing Machinery, New York, NY, USA, 3. DOI:https://doi.org/10.1145/29996366. 29996426. 24 pages.

Gross, Hannes et al., "Generic Low-Latency Masking in Hardware", 2018, IACR Transactions on Cryptographic Hardware and Embedded Systems, 2018(2), 1-21. https://doi.org/10.13154/tches. v2018.i2.1-21. 21 pages.

Moos, Thorben et al., "Glitch-Resistant Masking Revisited or Why Proofs in the Robust Probing Model are Needed", IACR Transactions on Cryptographic Hardware and Embedded Systems, 2019(2), 256-292. https://doi.org/10.13154/tches.v2019.i2.256-292. 37 pages.

Notification of Transmittal of the International Search Report and the Written Opinion of the International Searching Authority, or the Declaration with mail date Feb. 28, 2023 re: Int'l Appln. No. PCT/US2022/051054. 13 pages.

\* cited by examiner

LOW-LATENCY MULTI-DOMAIN MASKING

DETAILED DESCRIPTION OF THE EMBODIMENTS

Hardware masking is a countermeasure that may be used to make power analysis attacks more difficult. Masking attempts to decouple the secret and/or processed values of a cryptographic implementation from its intermediate values. One method of masking is to probabilistically split each bit of a computation into multiple "shares". Because the values of the shares are the result of an operation that processes random values, each share bit does not yield information about the original bit. Computations may then be performed on the individual bit shares (a.k.a. mask shares) without revealing information about the original (secret) bit. In Domain Oriented Masking (DOM), each share of a variable is associated with one share domain. Thus, the basic idea of the DOM approach is to keep the shares of all domains independent from shares of the other domains.

In an embodiment, a multi-domain masked AND gate includes inner-domain calculations, re-sharing, register stage, cross-domain calculations, and compression. The inner-domain multiplication and the re-sharing are calculated prior to storing the re-shared variables in the register stage. Thus, the inputs to the cross-domain multiplication and the compression are performed on variables that have been refreshed by additional randomness. This AND gate does not need statistically independent inputs, is secure in the probing model even in the presence of glitches, also known as the robust probing model. Additionally, this AND gate is NI, SNI and PINI robust. A two-domain input and two domain output AND gate can be implemented using six (6) registers, four (4) two input logical AND gates, and eight (8) exclusive-OR (XOR) gates. The AND gate may also be used to implement an AES S-box that has two (2) register stages and takes two (2) clock cycles per computation.

Figure 1:
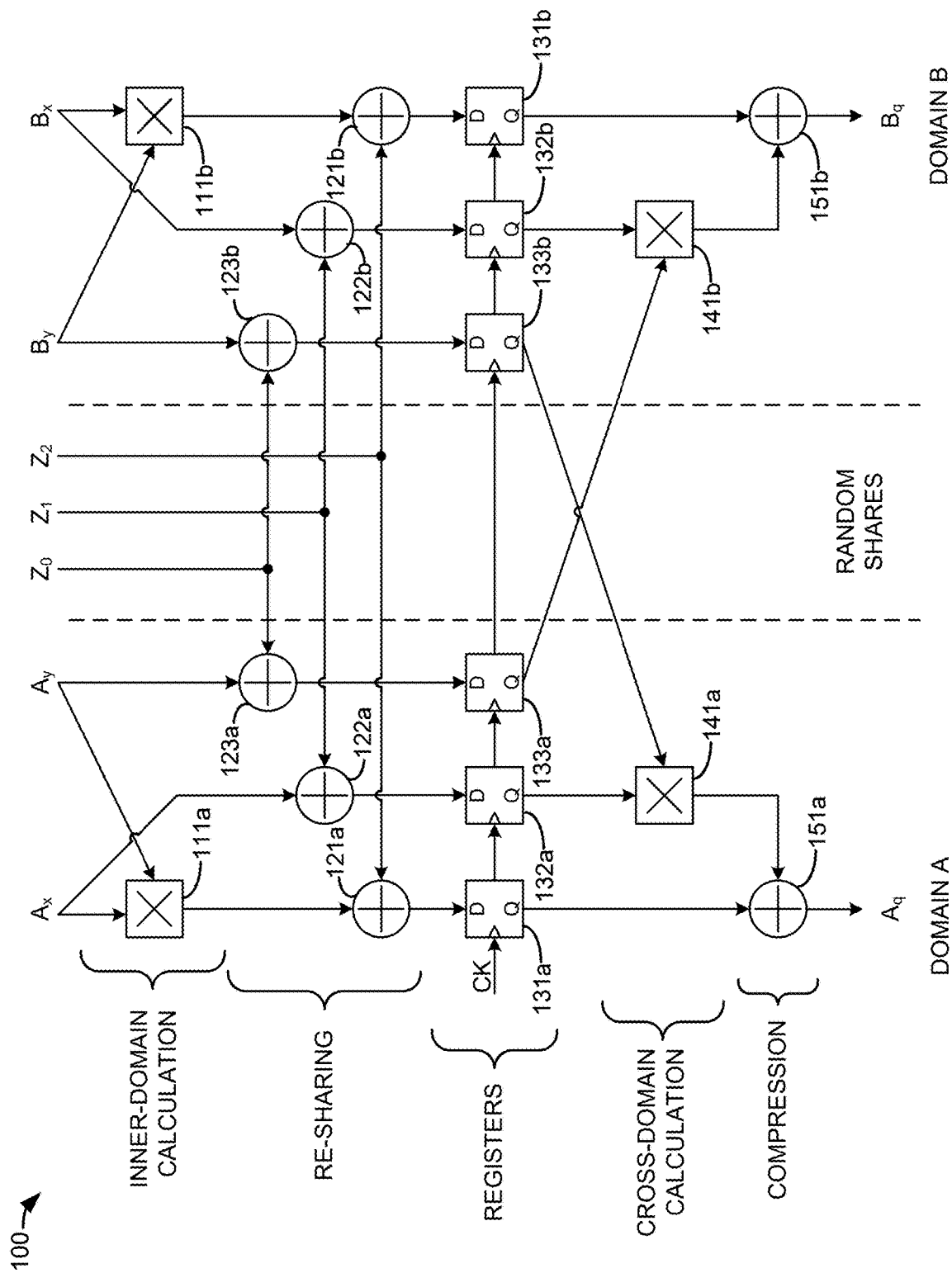
FIG. 1 is a diagram illustrating an example two domain masked AND gate.

FIG. 1 is a diagram illustrating an example two domain masked AND gate. In FIG. 1, two domain masked AND gate 100 comprises AND gates 111a-111b, XOR gates 121a-123a, XOR gates 121b-123b, registers (e.g., D flip-flop, latch, etc.) 131a-133a, registers 131b-133b, AND gates 141a-141b, and XOR gates 151a-151b. Masked AND gate 100 securely computes the function $q = x \wedge y$ (i.e., x logically AND'd with y), where each variable has been split into two Boolean mask shares (i.e., $x = (A_x, B_x) = A_x \oplus B_x$, and $y = (A_y, B_y) = A_y \oplus B_y$) and the output is two shares $(A_q, B_q)$. Thus, AND gate 100 securely computes $AND_{masked}(A_x, B_x, A_y, B_y, Z_{0-2}) = (A_q, B_q)$ where $Z_{0-2}$ are three random variables (i.e., $Z_0, Z_1,$ and $Z_2$) and $q = A_q \oplus B_q = x \wedge y$.

Masked AND gate 100 is divided into two share domains: domain A and domain B. Domain A receives the input shares $A_x$ and $A_y$, receives random values $Z_0$-$Z_2$, and produces the output share $A_q$. Domain A includes AND gate 111a, XOR gates 121a-123a, registers 131a-133a, AND gate 141a, and XOR gate 151a. Domain B receives the input shares $B_x$ and $B_y$, receives random values $Z_0$-$Z_2$, and produces the output share $B_q$. Domain B includes AND gate 111b, XOR gates 121b-123b, registers 131b-133b, AND gate 141b, and XOR gate 151b.

In domain A, AND gate 111a receives $A_x$ and $A_y$ and produces a result that is provided to XOR gate 121a. The calculation of $A_x \wedge A_y$ by AND gate 111a may be referred to as inner-domain calculation. $A_x$ is also provided to XOR gate 122a. $A_y$ is also provided to XOR gate 123a. XOR gate 121a also receives random input variable $Z_2$. XOR gate 122a also receives random input variable $Z_1$. XOR gate 123a also receives random input variable $Z_0$. The calculations of $Z_2 \oplus (A_x \wedge A_y)$, $Z_1 \oplus A_x$, and $Z_0 \oplus A_y$ by XOR gates 121a-123a, respectively, may be referred to as re-sharing. The outputs of XOR gates 121a-123a are stored in registers 131a-133a, respectively. The outputs of XOR gates 121a-123a are stored in registers 131a-133a timed (latched) by a clock signal, CK.

The latched (e.g., de-glitched) output of register 132a (i.e., the latched result of $Z_1 \oplus A_x$) is provided to AND gate 141a. AND gate 141a also receives the output of register 133b (i.e., the latched result of $Z_0 \oplus B_y$) from domain B. The calculation of $(Z_1 \oplus A_x) \wedge (Z_0 \oplus B_y)$ may be referred to as cross-domain calculation. The output of AND gate 141a is provided to XOR gate 151a. XOR gate 151a also receives the output of register 131a (i.e., the latched result of $Z_2 \oplus [A_x \wedge A_y]$). The calculation performed by XOR gate 151a may be referred to as compression. The output of XOR gate 151a is the output share $A_q$.

In domain B, AND gate 111b receives $B_x$ and $B_y$ and produces a result that is provided to XOR gate 121b. The calculation of $B_x \wedge B_y$ by AND gate 111b may be referred to as inner-domain calculation. $B_x$ is also provided to XOR gate 122b. $B_y$ is also provided to XOR gate 123b. XOR gate 121b also receives random input variable $Z_2$. XOR gate 122b also receives random input variable $Z_1$. XOR gate 123b also receives random input variable $Z_0$. The calculations of $Z_2 \oplus (B_x \wedge B_y)$, $Z_1 \oplus B_x$, and $Z_0 \oplus B_y$ by XOR gates 121b-123b, respectively, may be referred to as re-sharing. The outputs of XOR gates 121b-123b are stored in registers 131b-133b, respectively. The outputs of XOR gates 121b-123b are stored in registers 131b-133b timed (latched) by clock signal, CK.

The latched (e.g., de-glitched) output of register 132b (i.e., the latched result of $Z_1 \oplus B_x$) is provided to AND gate 141b. AND gate 141b also receives the output of register 133a (i.e., the latched result of $Z_0 \oplus A_y$) from domain A. The calculation of $(Z_1 \oplus B_x) \wedge (Z_0 \oplus A_y)$ may be referred to as cross-domain calculation. The output of AND gate 141b is provided to XOR gate 151b. XOR gate 151b also receives the output of register 131b (i.e., the latched result of $Z_2 \oplus [B_x \wedge B_y]$). The calculation of performed by XOR gate 151b may be referred to as compression. The output of XOR gate 151b is the output share $B_q$.

Figure 2:
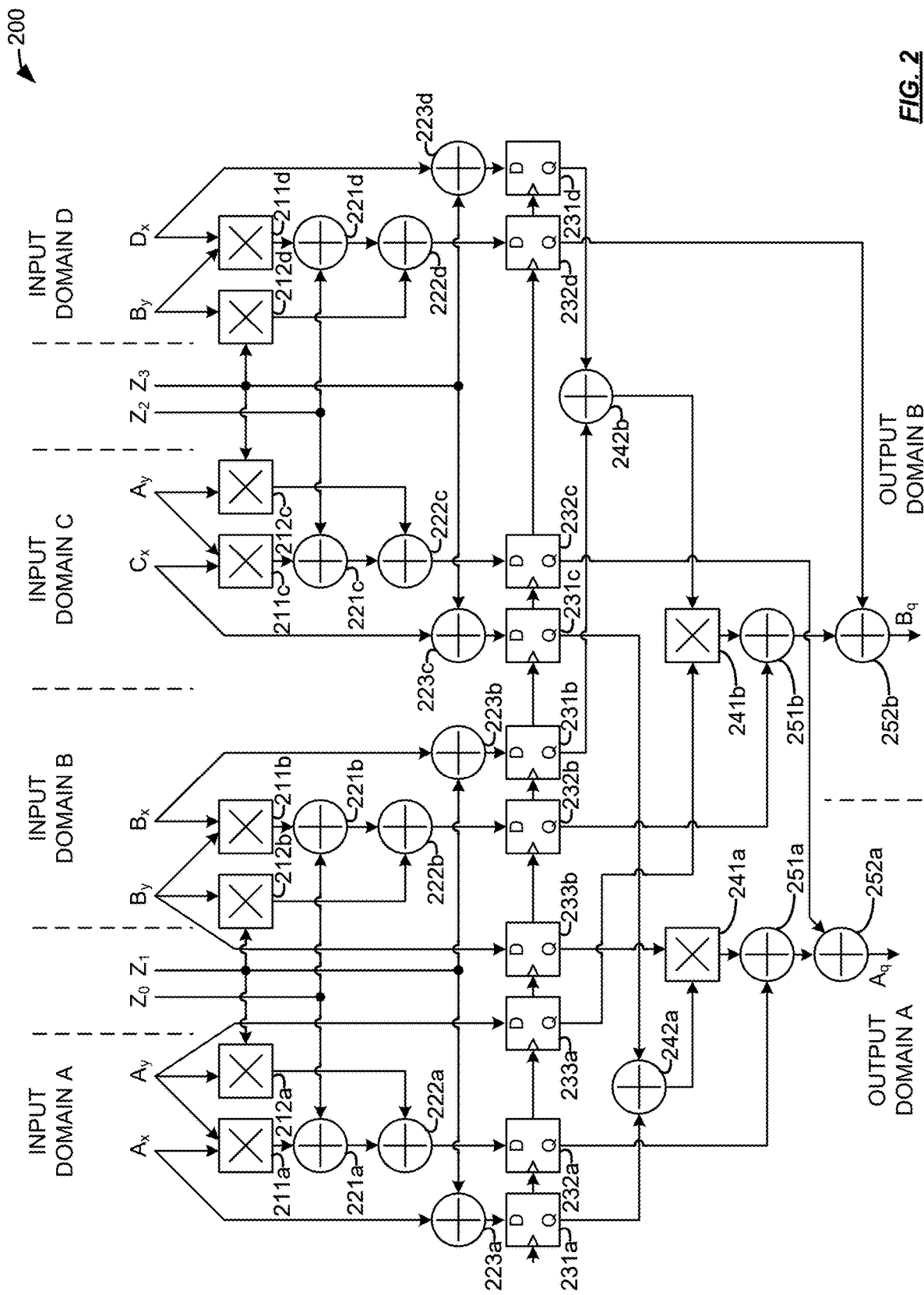
FIG. 2 is a diagram illustrating an example of a masked AND gate that takes a first operand using four shares and a second operand using two shares and produces a two share output (a.k.a., 4/2-to-2 domain AND gate).

FIG. 2 is a diagram illustrating an example of a masked AND gate that takes a first operand using four shares and a second operand using two shares and produces a two share output (a.k.a., 4/2-to-2 domain AND gate). In FIG. 2, 4/2-to-2 domain AND gate 200 comprises AND gates 211a-212a, AND gates 211b-212b, AND gates 211c-212c, AND gates 211d-212d, XOR gates 221a-223a, XOR gates 221b-

223b, XOR gates 221c-223c, XOR gates 221d-223d, registers (e.g., D flip-flop, latch, etc.) 231a-233a, registers 231b-233b, registers 231c-232c, 231d-232d, XOR gates 242a-242b, AND gates 241a-241b, XOR gates 251a-251b, and XOR gate 252a-252b. Masked AND gate 200 securely computes the function $q=x\wedge y$ (i.e., x logically AND'd with y), where the x variable has been split into four (4) Boolean mask shares, the y variable has been split into two Boolean mask shares (i.e., $X=(A_x,B_x,C_x,D_x)=A_x \oplus B_x \oplus C_x \oplus D_x$, and $y=(A_y,B_y)=A_y \oplus B_y$), and the output is two shares ($A_q,B_q$). Thus, AND gate 200 securely computes $AND_{masked}(A_x,B_x,C_x,D_x,A_y,B_y,Z_{0-3})=(A_q,B_q)$ where $Z_{0-3}$ are four random variables (i.e., $Z_0$, $Z_1$, $Z_2$, and $Z_3$), and $q=A_q \oplus B_q=x\wedge y$.

The inputs to masked AND gate 200 are divided into four share domains: input domain A, input domain B, input domain C, and input domain D. Input domain A receives the input shares $A_x$ and $A_y$ and random values $Z_0$-$Z_1$. Input domain A includes AND gates 211a-212a, XOR gates 221a-223a, and registers 231a-233a. Input domain B receives the input shares $B_x$ and $B_y$ and random values $Z_0$-$Z_1$. Input domain B includes AND gates 211b-212b, XOR gates 221b-223b, and registers 231b-233b. Input domain C receives the input shares $C_x$ and $A_y$ and random values $Z_2$-$Z_3$. Input domain C includes AND gates 211c-212c, XOR gates 221c-223c, and registers 231c-232c. Input domain D receives the input shares $D_x$ and $B_y$ and random values $Z_2$-$Z_3$. Input domain D includes AND gates 211d-212d, XOR gates 221d-223d, and registers 231d-232d.

Output domain A receives the outputs of registers 231a-232a from input domain A, the output of register 233b from input domain B, and the outputs of registers 231c-232c from input domain C. Output domain A includes XOR gate 242a, AND gate 241a, and XOR gates 251a-252a. Output domain B receives the output of register 233a from input domain A, the outputs of registers 231b-232b from input domain B, and the outputs of registers 231d-232d from input domain C. Output domain B includes XOR gate 242b, AND gate 241b, and XOR gates 251b-252b.

In input domain A, AND gate 211a receives $A_x$ and $A_y$ and produces a result that is provided to XOR gate 221a. AND gate 212a receives $A_y$ and Z and produces a result that is provided to XOR gate 222a. $A_x$ is also provided to XOR gate 223a. $A_y$ is also provided to register 233a. XOR gate 221a also receives random input variable $Z_0$. The output of XOR gate 221a is provided to XOR gate 222a. XOR gate 223a also receives random input variable $Z_1$. The outputs of XOR gates 222a-223a are stored in registers 232a-231a, respectively. The outputs of XOR gates 222a-223a and input variable $A_y$ are stored in registers 231a-233a timed (latched) by a clock signal, CK.

In input domain B, AND gate 211b receives $B_x$ and $B_y$ and produces a result that is provided to XOR gate 221b. AND gate 212b receives $B_y$ and $Z_1$ and produces a result that is provided to XOR gate 222b. $B_x$ is also provided to XOR gate 223b. $B_y$ is also provided to register 233b. XOR gate 221b also receives random input variable $Z_0$. The output of XOR gate 221b is provided to XOR gate 222b. XOR gate 223b also receives random input variable $Z_1$. The outputs of XOR gates 222b-223b are stored in registers 232b-231b, respectively. The outputs of XOR gates 222b-223b and input variable $B_y$ are stored in registers 231b-233b timed (latched) by clock signal, CK.

In input domain C, AND gate 211c receives $C_x$ and $A_y$ and produces a result that is provided to XOR gate 221c. AND gate 212c receives $A_y$ and $Z_3$ and produces a result that is provided to XOR gate 222c. $C_x$ is also provided to XOR gate 223c. XOR gate 221c also receives random input variable $Z_2$. The output of XOR gate 221c is provided to XOR gate 222c. XOR gate 223c also receives random input variable $Z_3$. The output of XOR gate 222c is stored in register 232c. The output of XOR gate 223c is stored in register 231c. The outputs of XOR gates 222c-223c are stored in registers 231c-232c timed (latched) by clock signal, CK.

In input domain D, AND gate 211d receives $D_x$ and $B_y$ and produces a result that is provided to XOR gate 221d. AND gate 212d receives $B_y$ and $Z_3$ and produces a result that is provided to XOR gate 222d. $D_x$ is also provided to XOR gate 223d. XOR gate 221d also receives random input variable $Z_2$. The output of XOR gate 221d is provided to XOR gate 222d. XOR gate 223d also receives random input variable $Z_3$. The output of XOR gate 222d is stored in register 232d. The output of XOR gate 223d is stored in register 231d. The outputs of XOR gates 222d-223d are stored in registers 231d-232d timed (latched) by clock signal, CK.

In output domain A, the latched (e.g., de-glitched) output of register 231a (i.e., the latched result of $Z_1 \oplus A_x$) from input domain A is provided to XOR gate 242a. The latched output of register 231c (i.e., the latched result of $Z_3 \oplus C_x$) from input domain C is also provided to XOR gate 242a. The output of XOR gate 242a is provided to AND gate 241a. AND gate 241a also receives the output of register 233b (i.e., the latched version of $B_y$) from input domain B. The output of AND gate 241a is provided to XOR gate 251a. XOR gate 251a also receives the output of register 232a. The output of XOR gate 251a is provided to XOR gate 252a. XOR gate 252a also receives the latched output of register 232c from input domain C. The output of XOR gate 252a is the output share $A_q$.

In output domain B, the latched (e.g., de-glitched) output of register 231b (i.e., the latched result of $Z_1 \oplus B_x$) from input domain B is provided to XOR gate 242b. The latched output of register 231d (i.e., the latched result of $Z_3 \oplus D_x$) from input domain D is also provided to XOR gate 242b. The output of XOR gate 242b is provided to AND gate 241b. AND gate 241b also receives the output of register 233a (i.e., the latched version of $A_y$) from input domain A. The output of AND gate 241b is provided to XOR gate 251b. XOR gate 251b also receives the output of register 232b. The output of XOR gate 251b is provided to XOR gate 252b. XOR gate 252b also receives the latched output of register 232d from input domain D. The output of XOR gate 252b is the output share $B_q$.

Figure 3:
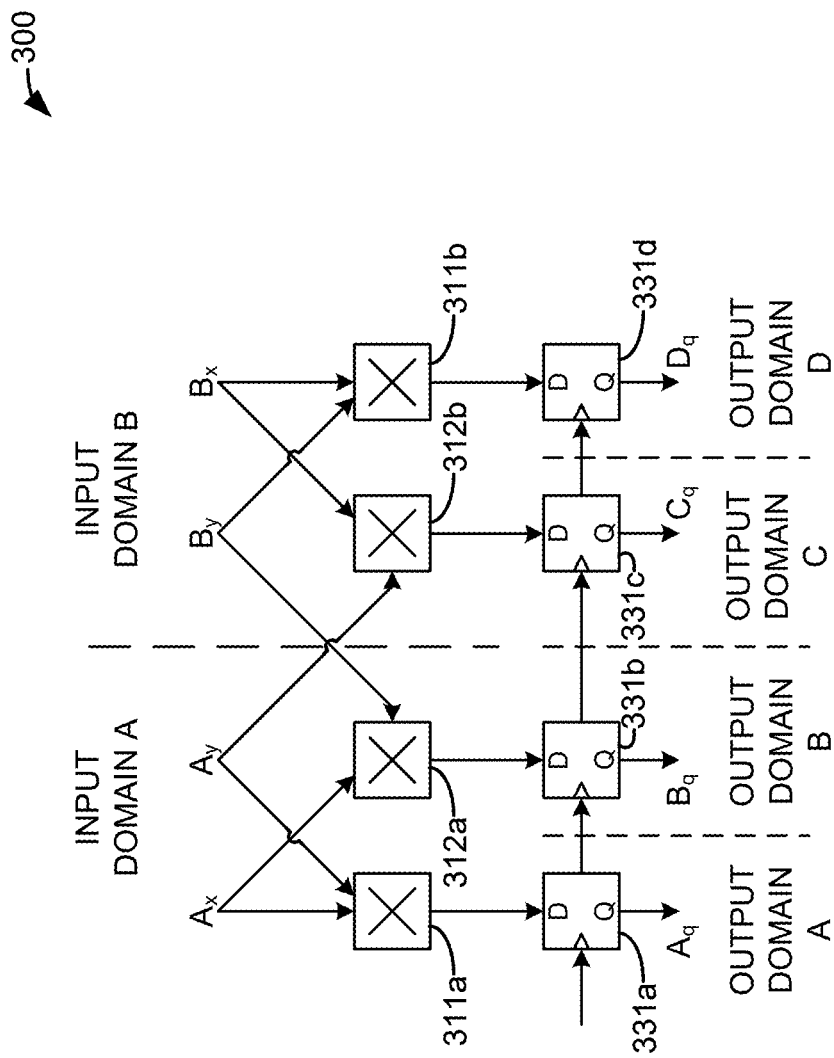
FIG. 3 is a diagram illustrating an example two domain to four domain masked AND gate.

FIG. 3 is a diagram illustrating an example two domain to four domain masked AND gate (a.k.a., 2-to-4 domain AND gate). In FIG. 3, 2-to-4 domain AND gate 300 comprises AND gates 311a-312a, AND gates 311b-312b, and registers 331a-331d. Masked AND gate 300 securely computes the function $q=x\wedge y$ (i.e., x logically AND'd with y), where the x variable has been split into two (2) Boolean mask shares, the y variable has been split into two Boolean mask shares (i.e., $x=(A_x,B_x)=A_x \oplus B_x$, and $y=(A_y,B_y)=A_y \oplus B_y$), and the output has four shares ($A_q,B_q,C_q,D_q$). Thus, AND gate 300 securely computes $AND_{masked}(A_x,B_x,A_y,B_y)=(A_q,B_q,C_q,D_q)$ where $q=A_q \oplus B_q \oplus C_q \oplus D_q=x\wedge y$. Note that additional random variables (e.g., $Z_x$) are not required. Note also that to prevent cross-domain leakage, the input variables $A_x$, $B_x$, $A_y$, and $B_y$ need to be statistically independent.

The inputs to masked AND gate 300 are divided into two share domains: input domain A and input domain B. Input domain A receives the input shares $A_x$ and $A_y$. Input domain A includes AND gates 311a-312a. Input domain B receives the input shares $B_x$ and $B_y$. Input domain B includes AND gates 311b-312b. and registers 231a-233a. Output domain A receives the output of AND gate 311a from input domain A and includes the output of register 331a. Output domain B receives the output of AND gate 312a from input domain A and includes the output of register 331b . . . . Output domain C receives the output of AND gate 312b from input domain B and includes the output of register 331c. Output domain D receives the output of AND gate 311b from input domain B and includes the output of register 331d.

In input domain A, AND gate 311a receives $A_x$ and $A_y$ and produces a result that is provided to register 331a. The output of register 331a is the output domain A share $A_q$. AND gate 312a receives $A_x$ and $B_y$ and produces a result that is provided to register 331b. The output of register 331b is the output domain B share $B_q$. In input domain B, AND gate 312b receives $B_x$ and $A_y$ and produces a result that is provided to register 331c. The output of register 331c is the output domain C share $C_q$. AND gate 311b receives $B_x$ and $B_y$ and produces a result that is provided to register 331d. The output of register 331d is the output domain D share $D_q$.

Figure 4:
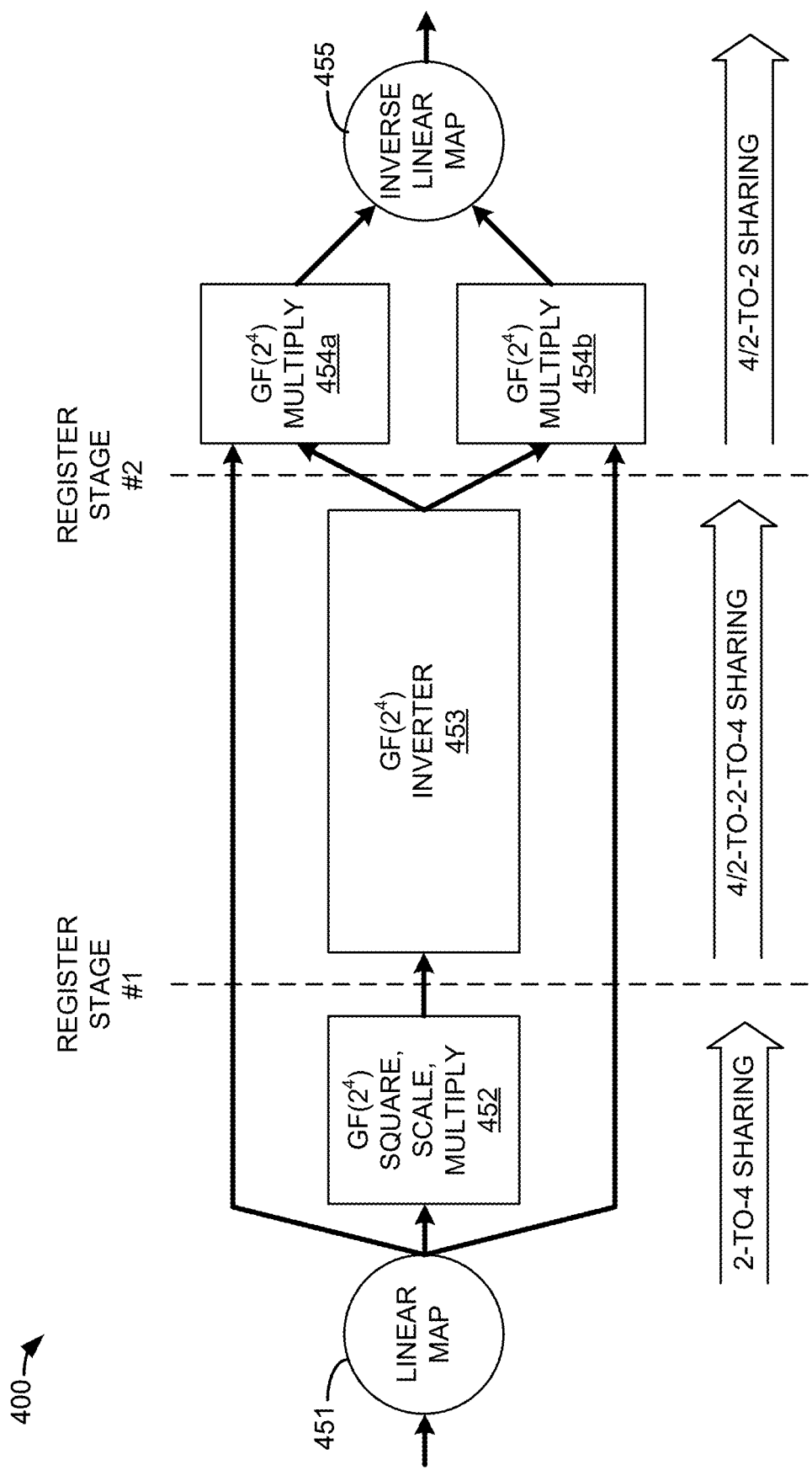
FIG. 4 is a block diagram illustrating an example use of low-latency domain oriented masking to implement the Advanced Encryption Standard (AES) S-box.

FIG. 4 is a block diagram illustrating an example use of low-latency domain oriented masking to implement the Advanced Encryption Standard (AES) S-box. In FIG. 4, system 400 comprises linear map 451, $GF(2^4)$ square, scale, and multiply 452, $GF(2^4)$ inverter 453, first $GF(2^4)$ multiply 454a, second $GF(2^4)$ multiply 454b, inverse linear map 455. In an embodiment, the elements of system 400 may reside on an integrated circuit.

The input to system 400 is received by linear map 451. The output of linear map 451 is provided to $GF(2^4)$ square, scale, and multiply 452, first $GF(2^4)$ multiply 454a, and second $GF(2^4)$ multiply 454b. The output of $GF(2^4)$ square, scale, and multiply 452 is provided to $GF(2^4)$ inverter 453. The output of $GF(2^4)$ square, scale, and multiply 452 is held at register stage #1 before being provided to $GF(2^4)$ inverter 453. The output of $GF(2^4)$ inverter 453 is provided to first $GF(2^4)$ multiply 454a, and second $GF(2^4)$ multiply 454b. The output of $GF(2^4)$ inverter 453 is held at register stage #2 before being provided to first $GF(2^4)$ multiply 454a, and second $GF(2^4)$ multiply 454b. The outputs of first $GF(2^4)$ multiply 454a, and second $GF(2^4)$ multiply 454b are provided to inverse linear map 455. The output of inverse linear map 455 is the output of system 400.

From the input of system 400 to register stage #1 (i.e., linear map 451 and $GF(2^4)$ square, scale, and multiply 452), 2-to-4 sharing circuitry (e.g., masked AND gate 300) is used. From register stage #1 to register stage #2 (i.e., $GF(2^4)$ inverter 453), 4/2-to-2 and 2-to-4 sharing circuitry (e.g., masked AND gate 200 and masked AND gate 300, respectively) is used. Finally, from register stage #2 to the output of system 400 (i.e., first $GF(2^4)$ multiply 454a, second $GF(2^4)$ multiply 454b, and inverse linear map 455) 4/2-to-2 sharing circuitry (e.g., masked AND gate 200) is used.

Figure 5:
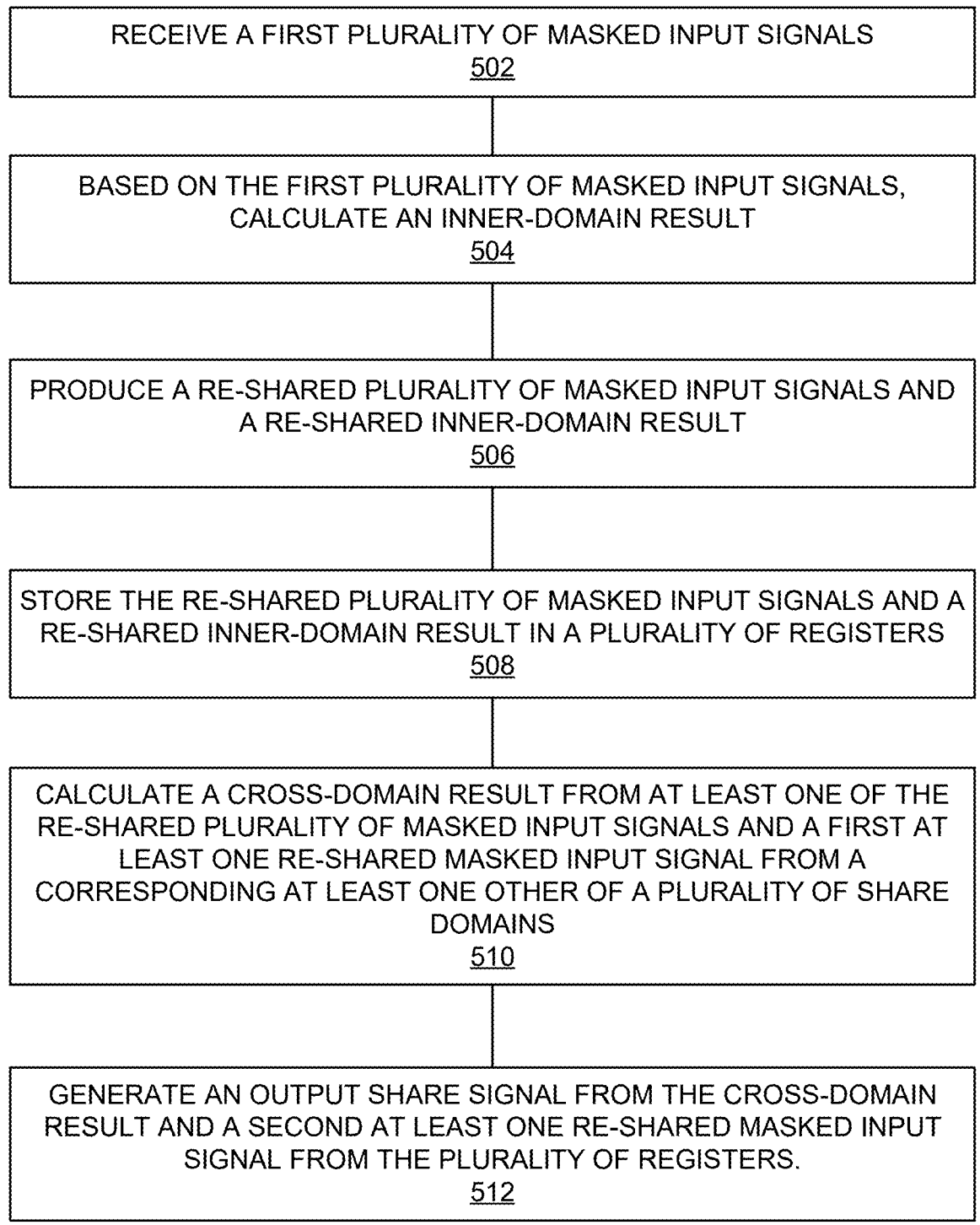
FIG. 5 is a flowchart illustrating low-latency multi-domain masking.

FIG. 5 is a flowchart illustrating low-latency multi-domain masking. One or more steps illustrated in FIG. 5 may be performed by, for example, masked AND gate 100, masked AND gate 200, system 400, and/or their components. A first plurality of masked input signals is received (502). For example, masked AND gate 100 may receive masked input signal $A_x$ and $A_y$. Based on the first plurality of masked input signals, an inner-domain result is calculated (504). For example, AND gate 111a of masked AND gate 100 may receive $A_x$ and $A_y$ and produce a result that is provided to XOR gate 121a of masked AND gate 100.

A re-shared plurality of masked input signals and a re-shared inner domain result are produced (506). For example, XOR gate 121a may also receive random input variable $Z_2$. $A_x$ and random input variable $Z_1$ may be provided to XOR gate 122a of masked AND gate 100. $A_y$ and random input variable $Z_0$ may be provided to XOR gate 123a of masked AND gate 100. Thus, causing the calculations of $Z_2 \oplus (A_x \wedge A_y)$, $Z_1 \oplus A_x$, and $Z_0 \oplus A_y$ by XOR gates 121a-123a, respectively, to be produced. The re-shared plurality of masked input signals and a re-shared inner domain result are stored in a plurality of registers. For example, the outputs of XOR gates 121a-123a (i.e., $Z_2 \oplus [A_x \wedge A_y]$, $Z_1 \oplus A_x$, and $Z_0 \oplus A_y$) are stored in registers 131a-133a timed (latched) by a clock signal, CK.

A cross-domain result from at least one of the re-shared plurality of masked input signals and a first at least one re-shared masked input signal from a corresponding at least one other of a plurality of share domains is calculated (510). For example, the latched (e.g., de-glitched) output of register 132a (i.e., the latched result of $Z_1 \oplus A_x$) from domain A of masked AND gate 100 and the output of register 133b (i.e., the latched result of $Z_0 \oplus B_y$) from domain B of masked AND gate 100 may be provided to AND gate 141a. An output share signal is generated from the cross-domain result and a second at least one re-shared masked input signal from the plurality of registers (512). For example, XOR gate 151a may receive the output of register 131a (i.e., the latched result of $Z2 \oplus [Ax \wedge Ay]$) and the output of AND gate 141a (i.e., the cross-domain result $[Z1 \oplus Ax] \wedge [Z0 \oplus By]$) and produce the output share Aq.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of masked AND gate 100, masked AND gate 200, masked AND gate 300, and/or system 400, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 6:
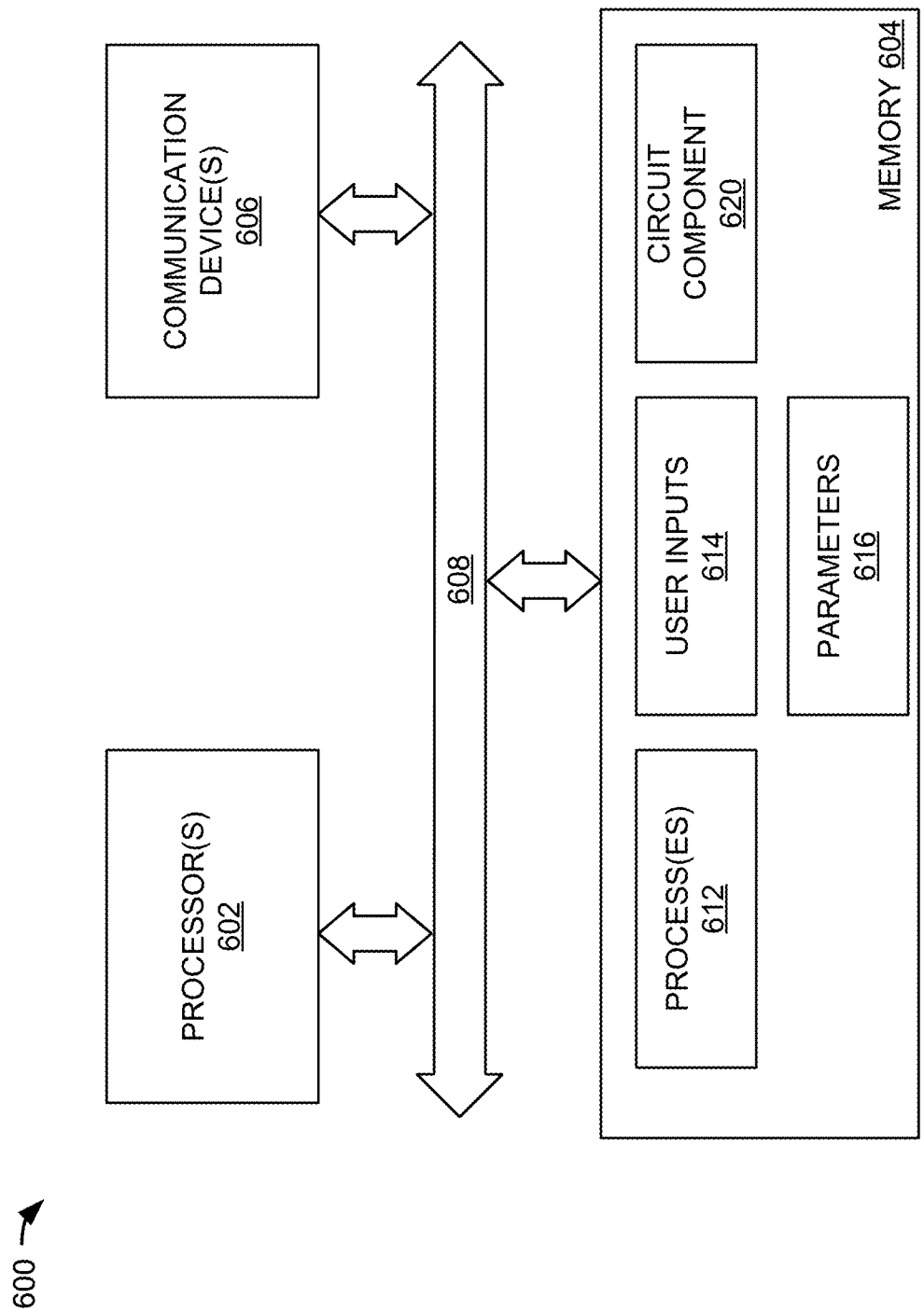
FIG. 6 is a block diagram of a processing system.

FIG. 6 is a block diagram illustrating one embodiment of a processing system 600 for including, processing, or generating, a representation of a circuit component 620. Processing system 600 includes one or more processors 602, a memory 604, and one or more communications devices 606. Processors 602, memory 604, and communications devices 606 communicate using any suitable type, number, and/or configuration of wired and/or wireless connections 608.

Processors 602 execute instructions of one or more processes 612 stored in a memory 604 to process and/or generate circuit component 620 responsive to user inputs 614 and parameters 616. Processes 612 may be any suitable electronic design automation (EDA) tool or portion thereof used to design, simulate, analyze, and/or verify electronic circuitry and/or generate photomasks for electronic circuitry. Representation 620 includes data that describes all or portions of masked AND gate 100, masked AND gate 200, masked AND gate 300, and/or system 400, and their components, as shown in the Figures.

Representation 620 may include one or more of behavioral, register transfer, logic component, transistor, and layout geometry-level descriptions. Moreover, representation 620 may be stored on storage media or communicated by carrier waves.

Data formats in which representation 620 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 614 may comprise input parameters from a keyboard, mouse, voice recognition interface, microphone and speakers, graphical display, touch screen, or other type of user interface device. This user interface may be distributed among multiple interface devices. Parameters 616 may include specifications and/or characteristics that are input to help define representation 620. For example, parameters 616 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 604 includes any suitable type, number, and/or configuration of non-transitory computer-readable storage media that stores processes 612, user inputs 614, parameters 616, and circuit component 620.

Communications devices 606 include any suitable type, number, and/or configuration of wired and/or wireless devices that transmit information from processing system 600 to another processing or storage system (not shown) and/or receive information from another processing or storage system (not shown). For example, communications devices 606 may transmit circuit component 620 to another system. Communications devices 606 may receive processes 612, user inputs 614, parameters 616, and/or circuit component 620 and cause processes 612, user inputs 614, parameters 616, and/or circuit component 620 to be stored in memory 604.

Implementations discussed herein include, but are not limited to, the following examples:

Example 1: An integrated circuit, comprising: inner-domain calculation circuitry to respectively receive a plurality of masked input signals in each of a plurality of masked domains; re-sharing circuitry to respectively receive results from the inner-domain calculation circuitry of each of the plurality of masked domains and to produce a respective plurality of re-shared results; a plurality of registers to respectively receive the plurality of re-shared results in the plurality of masked domains from the inner-domain calculation circuitry of the plurality of masked domains; cross-domain calculation circuitry to respectively receive re-shared results from each of the plurality of masked domains and to each respectively produce a cross-domain result; and compression calculation circuitry to respectively generate an output share signal in each of the plurality of masked domains from the cross-domain results and the re-shared results.

Example 2: The integrated circuit of example 1, wherein the plurality of masked input signals are statistically dependent.

Example 3: The integrated circuit of example 1, wherein the inner-domain calculation circuitry comprises a first logical AND function.

Example 4: The integrated circuit of example 3, wherein the re-sharing circuitry respectively randomizes the result of the inner-domain calculation circuitry and each of the plurality of masked input signals of that masked domain.

Example 5: The integrated circuit of example 4, wherein the re-sharing circuitry of each of the plurality of masked domains uses a same set of random input values.

Example 6: The integrated circuit of example 5, wherein the cross-domain calculation circuitry comprises a second logical AND function.

Example 7: The integrated circuit of example 6, wherein the compression calculation circuitry comprises a logical exclusive-OR function receiving a cross-domain result.

Example 8: An integrated circuit comprising a plurality of share domains, each of the plurality of share domains comprising: inner-domain calculation circuitry to receive a first plurality of masked input signals; re-sharing circuitry to respectively receive results from the inner-domain calculation circuitry and to produce a plurality of re-shared results; a plurality of registers to respectively receive the plurality of re-shared results; cross-domain calculation circuitry to receive at least one re-shared result from a corresponding at least one other of the plurality of share domains and to produce a cross-domain result; and compression calculation circuitry to respectively generate an output share signal from the cross-domain result and at least one of the plurality of re-shared results from the plurality of registers.

Example 9: The integrated circuit of example 8, wherein the first plurality of masked input signals are statistically dependent with a second plurality of masked input signals received by the at least one other of the plurality of share domains.

Example 10: The integrated circuit of example 8, wherein the inner-domain calculation circuitry comprises a first logical AND function.

Example 11: The integrated circuit of example 10, wherein the re-sharing circuitry randomizes the result of the inner-domain calculation circuitry.

Example 12: The integrated circuit of example 11, wherein the re-sharing circuitry of each of the plurality of share domains uses a same set of random input values.

Example 13: The integrated circuit of example 12, wherein the cross-domain calculation circuitry comprises a second logical AND function.

Example 14: The integrated circuit of example 13, wherein the compression calculation circuitry comprises a logical exclusive-OR function receiving a cross-domain result.

Example 15: A method, comprising: receiving a first plurality of masked input signals; based on the first plurality of masked input signals, calculating an inner-domain result; producing a re-shared plurality of masked input signals and a re-shared inner-domain result; storing the re-shared plurality of masked input signals and a re-shared inner-domain result in a plurality of registers; calculating a cross-domain result from at least one of the re-shared plurality of masked input signals and a first at least one re-shared masked input signal from a corresponding at least one other of a plurality of share domains; and generate an output share signal from the cross-domain result and a second at least one re-shared masked input signal from the plurality of registers.

Example 16: The method of example 15, wherein the first plurality of masked input signals are statistically dependent with a second plurality of masked input signals received by the at least one other of the plurality of share domains.

Example 17: The method of example 15, wherein calculating the inner-domain result comprises a first logical AND function.

Example 18: The method of example 17, wherein producing a re-shared plurality of masked input signals and a re-shared inner-domain result randomizes the inner-domain result.

Example 19: The method of example 18, the plurality of share domains uses a same set of random input values.

Example 20: The method of example 19, wherein calculating a cross-domain result comprises a second logical AND function.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
   inner-domain calculation circuitry to respectively receive a plurality of masked input signals in each of a plurality of masked domains;
   re-sharing circuitry to respectively receive results from the inner-domain calculation circuitry of each of the plurality of masked domains and to produce a respective plurality of re-shared results;
   a plurality of registers to respectively receive the plurality of re-shared results in the plurality of masked domains from the inner-domain calculation circuitry of the plurality of masked domains;
   cross-domain calculation circuitry to respectively receive re-shared results from each of the plurality of masked domains and to each respectively produce a cross-domain result; and
   compression calculation circuitry to respectively generate an output share signal in each of the plurality of masked domains from the cross-domain results and the re-shared results.

2. The integrated circuit of claim 1, wherein the plurality of masked input signals are statistically dependent.

3. The integrated circuit of claim 1, wherein the inner-domain calculation circuitry comprises a first logical AND function.

4. The integrated circuit of claim 3, wherein the re-sharing circuitry respectively randomizes the result of the inner-domain calculation circuitry and each of the plurality of masked input signals of that masked domain.

5. The integrated circuit of claim 4, wherein the re-sharing circuitry of each of the plurality of masked domains uses a same set of random input values.

6. The integrated circuit of claim 5, wherein the cross-domain calculation circuitry receives values that are stored in registers and comprises a second logical AND function.

7. The integrated circuit of claim 6, wherein the compression calculation circuitry comprises a logical exclusive-OR function receiving a cross-domain result.

8. An integrated circuit comprising a plurality of share domains, each of the plurality of share domains comprising:
   inner-domain calculation circuitry to receive a first plurality of masked input signals;
   re-sharing circuitry to respectively receive results from the inner-domain calculation circuitry and to produce a plurality of re-shared results;
   a plurality of registers to respectively receive the plurality of re-shared results;
   cross-domain calculation circuitry to receive at least one re-shared result from a corresponding at least one other of the plurality of share domains and to produce a cross-domain result; and
   compression calculation circuitry to respectively generate an output share signal from the cross-domain result and at least one of the plurality of re-shared results from the plurality of registers.

9. The integrated circuit of claim 8, wherein the first plurality of masked input signals are statistically dependent with a second plurality of masked input signals received by the at least one other of the plurality of share domains.

10. The integrated circuit of claim 8, wherein the inner-domain calculation circuitry comprises a first logical AND function.

11. The integrated circuit of claim 10, wherein the re-sharing circuitry randomizes the result of the inner-domain calculation circuitry.

12. The integrated circuit of claim 11, wherein the re-sharing circuitry of each of the plurality of share domains uses a same set of random input values.

13. The integrated circuit of claim 12, wherein the cross-domain calculation circuitry comprises a second logical AND function.

14. The integrated circuit of claim 13, wherein the compression calculation circuitry comprises a logical exclusive-OR function receiving a cross-domain result.

15. A method, comprising:
   receiving a first plurality of masked input signals;
   based on the first plurality of masked input signals, calculating an inner-domain result;
   producing a re-shared plurality of masked input signals and a re-shared inner-domain result;
   storing the re-shared plurality of masked input signals and a re-shared inner-domain result in a plurality of registers;
   calculating a cross-domain result from at least one of the re-shared plurality of masked input signals and a first at least one re-shared masked input signal from a corresponding at least one other of a plurality of share domains; and
   generate an output share signal from the cross-domain result and a second at least one re-shared masked input signal from the plurality of registers.

16. The method of claim 15, wherein the first plurality of masked input signals are statistically dependent with a second plurality of masked input signals received by the at least one other of the plurality of share domains.

17. The method of claim 15, wherein calculating the inner-domain result comprises a first logical AND function.

18. The method of claim 17, wherein producing a re-shared plurality of masked input signals and a re-shared inner-domain result randomizes the inner-domain result.

19. The method of claim 18, the plurality of share domains uses a same set of random input values.

20. The method of claim 19, wherein calculating a cross-domain result comprises a second logical AND function.

* * * * *